Figure 10:
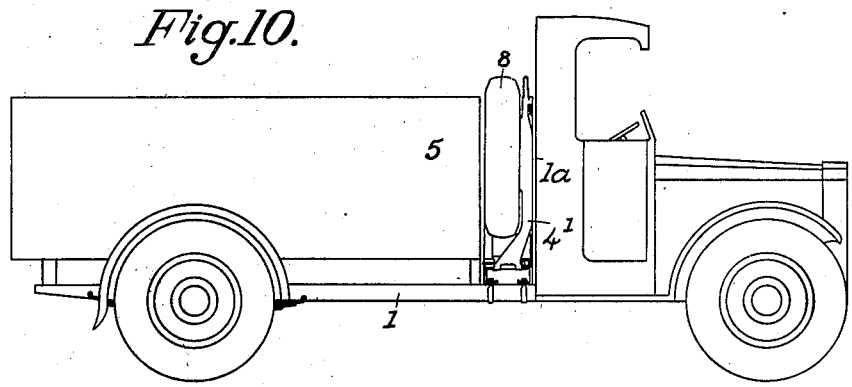

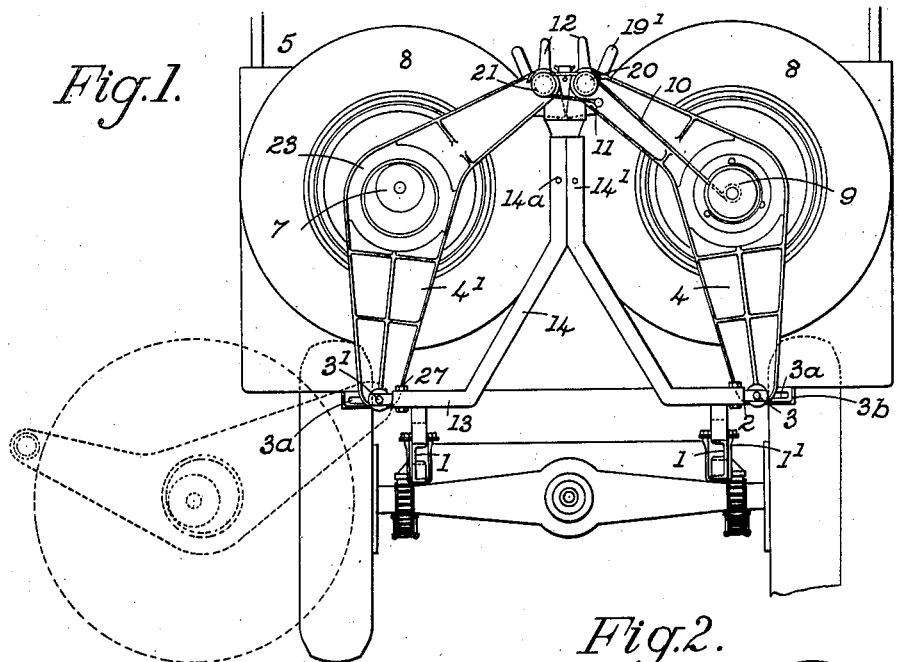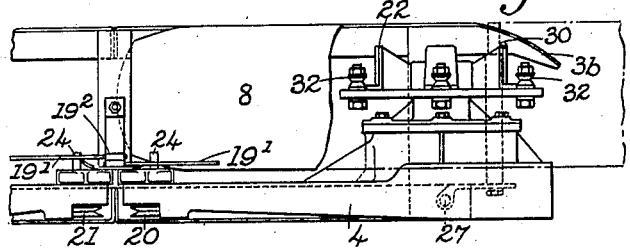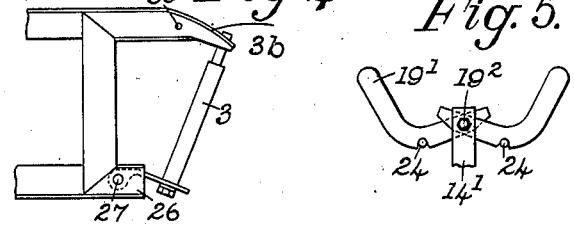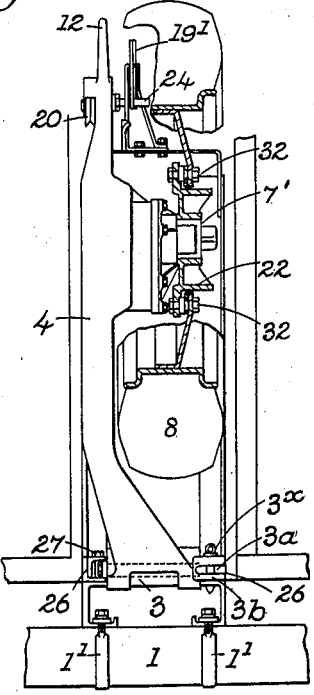

June 28, 1932. D. S. KENNEDY ET AL 1,864,829
SPARE TIRE CARRIER FOR ROAD VEHICLES
Filed July 22, 1930 4 Sheets-Sheet 2
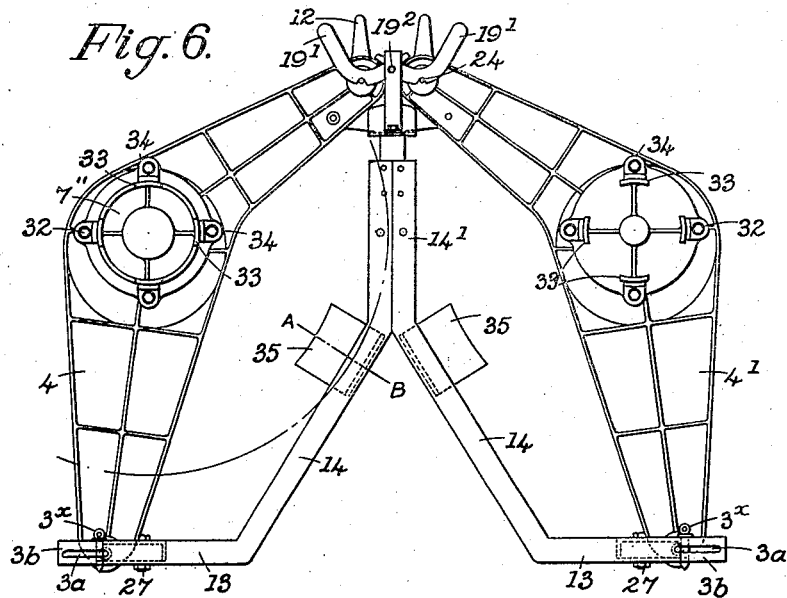
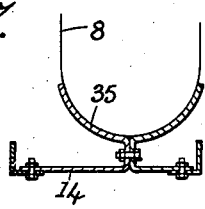
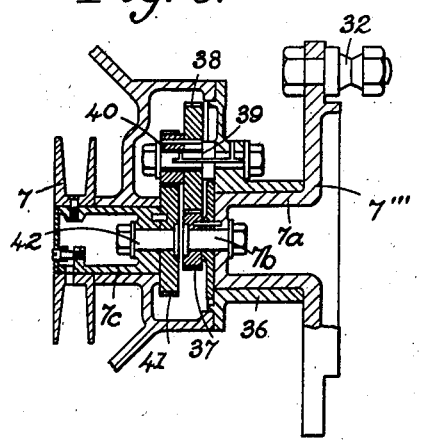
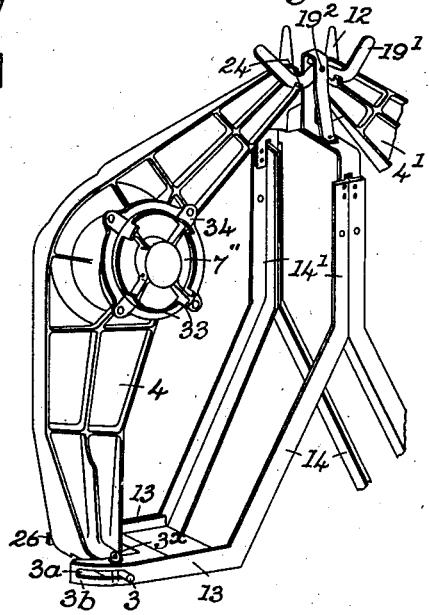

June 28, 1932.  D. S. KENNEDY ET AL  1,864,829
SPARE TIRE CARRIER FOR ROAD VEHICLES
Filed July 22, 1930  4 Sheets-Sheet 3

June 28, 1932. D. S. KENNEDY ET AL 1,864,829
SPARE TIRE CARRIER FOR ROAD VEHICLES
Filed July 22, 1930  4 Sheets-Sheet 4
*Fig.14.*  *Fig.15.*
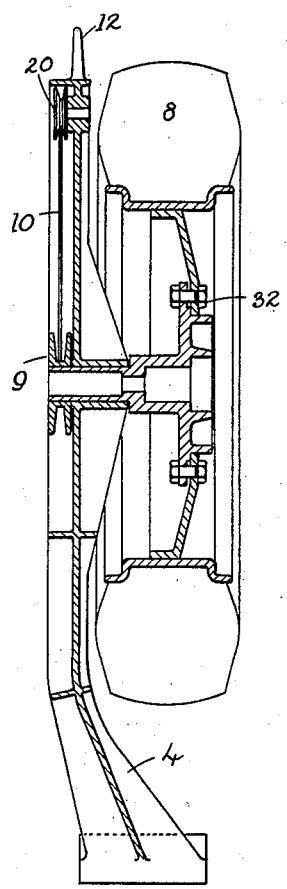
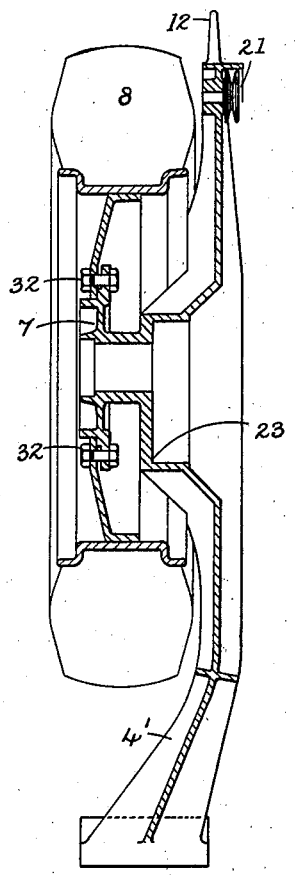
Inventors:
D. S. Kennedy &
J. T. Kemper;
By
Pennie, Davis, Marvin & Edmonds
Their Attorneys Patented June 28, 1932

1,864,829

UNITED STATES PATENT OFFICE

DONALD STUART KENNEDY AND IRWIN TREVANION KEMPE, OF LONGPARISH, ENGLAND

SPARE TIRE CARRIER FOR ROAD VEHICLES

Application filed July 22, 1930, Serial No. 469,794, and in Great Britain October 9, 1929.

This invention has reference to improved means for carrying spare wheels (or rim-fitted tires) on road vehicles. It is particularly applicable to self-propelled lorries fitted with removable wheels or removable rims having giant pneumatic or other tires; these large tires are extremely heavy and the tendency is to make them even larger, so that it is not only difficult to house or store them on the vehicle but also much more difficult to handle them, i. e. bring them from their storage place on the vehicle when it becomes necessary to change a damaged tire.

The present invention has for its principal object to provide upon a road vehicle a carrier for these spare wheels or spare rim-fitted tires which can be mechanically displaced from a position in which the mounted spare tire is stored on the vehicle to one in which the mounted spare tire is grounded or in position to be rolled to replace the damaged tire.

The invention has also for an object to provide means for swinging a carrier member on which a tire is supported, from an inward position to an outward position or from the outward position to the inward position.

A further object is to provide upon a pivoted carrier member which supports the mounted spare tire, means for effecting and controlling the swinging action of the carrier member.

Other objects are to provide a unit with self-contained operable means secured to the vehicle for both transporting the mounted spare tire and lowering it outwardly and downwardly to the ground when required; to provide a duplicated unit of pivoted carrier beams to serve each side of the vehicle; and to provide means for lowering the spare tire at either right angles or at an inclination to the line of the vehicle frame.

The invention is hereafter described with reference to the accompanying drawings, in which: Fig. 1 is a view in elevation showing a duplicated unit, seen looking from the front of the vehicle. Fig. 2 is a side view, partly in section, of an arrangement similar to that of Fig. 1, and Fig. 3 is a plan view of part of Fig. 1. Fig. 4 is a plan illustrating the swivelling action of a pivotal bearing for the frame of the carrier beam.

Figure 11:
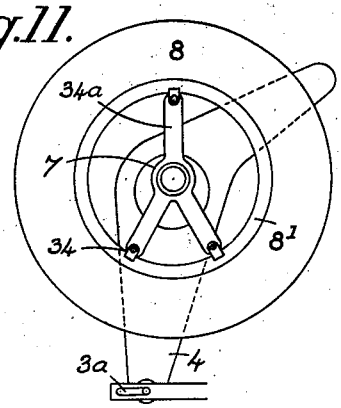
Figure 12:
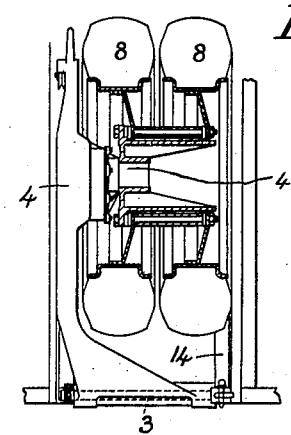
Figure 13:
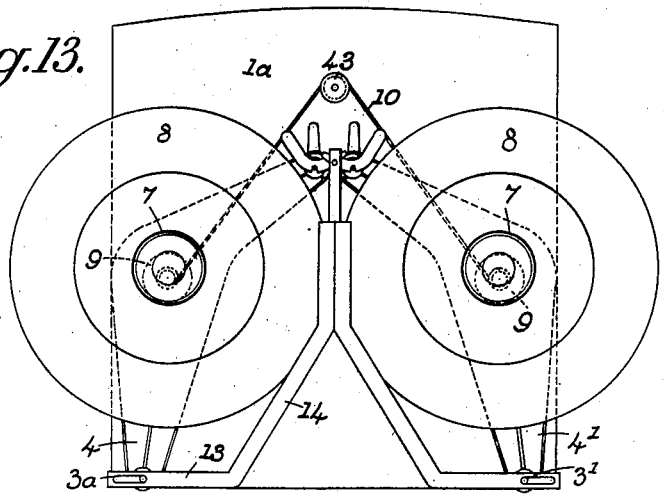

Fig. 5 shows a pivoted locking catch for the carrier beam. Fig. 6 shows diagrammatically a saddle or curved support for the tire periphery on a duplicated unit similar to that of Fig. 1 but without the spare wheels. Fig. 7 is a section on an enlarged scale taken on line A—B of Fig. 6. Fig. 8 is a sectional elevation of a suitable reduction gear. Fig. 9 is a perspective view of part of Fig. 6. Fig. 10 is a diagrammatic representation of a motor truck in side elevation showing one of the carrier beams arranged between the driver's cab and the vehicle body. Fig. 11 is a diagram showing an inverted Y-frame for a rim-fitted tire, this frame being mounted on the carrier beam. Fig. 12 is a view similar to Fig. 2 but showing a plurality of spare wheels. Fig. 13 is an elevation showing a cable-guiding pulley upon the back of the back of the cab and between the two carrier beams. Fig. 14 is an enlarged, sectional-detail along the carrier beam 4 of Fig. 1. Fig. 15 is an enlarged, sectional detail along the carrier beam 4' of Fig. 1.

In the subsequent description we refer to a "mounted spare tire", which term is to be taken as including a spare wheel (of the disc, artillery or wire-spoked type) or a tire fitted on a removable rim.

Referring to Figs. 1 and 2, we mount upon the vehicle frame 1, a bracket 2 carrying a pivotal bearing 3 for a carrier beam 4 normally upstanding above the chassis.

This beam 4 and its bearing 3 are preferably located in a space between the driver's cab 1a and the body 5, (see Fig. 10), and so arranged that the beam 4 can at its upper end be swung laterally outwards from the vehicle frame. Since the unit will generally be constructed to provide a spare wheel or mounted spare tire for each side of the vehicle, we have shown two carrier beams, pivoted one at each side of the vehicle frame. These two carrier beams 4, 4¹ are pivoted at 3, 3¹ to a transverse framework 13 secured upon the vehicle frame 1. Upon each of the pivoted beams we provide a support for the mounted spare tire 8, said support being designated by the numeral 7, as applied to the carrier beam 4¹; the support has any suitable means whereby the said spare tire can be attached thereto.

One support is revoluble, and may comprise as an attachment thereto, a suitable drum, pulley or winch on which a flexible connection 10 can be wound. By way of example, we have shown in Fig. 1 a hand-operated winch 9 provided with a flexible cable or chain 10 the free end of which is anchored to a point 11 on the carrier beam 4.

A handle 12 is indicated upon the top of the carrier beam 4 and, in the indrawn position, the beam 4 is inclined from the vertical slightly towards the center of the chassis.

Instead of the cable 10 and winch 9, as shown in Fig. 1, we may use another mechanical device for lowering and subsequently raising the outer end of the pivoted carrier frame 4. Thus in Fig. 2, instead of a winch 9, we have shown the revoluble support 7¹ fitted with a flange 22 forming a drum on which the cable 10 may be wound.

The front and rear members of the framework 13 will be seen in Fig. 9, and the said framework is provided with middle portions 14 of gable shape against the sides of which the tires upon the spare wheels 8 may rest. The carrier beams 4 4¹ are provided with suitable latching means (such as 19¹ hereafter described) whereby they may be positively latched and held in the indrawn position.

The beams 4 4¹ are shown in Figs. 1, 2 and 3 fitted at their normally upper ends with pulley sheaves 20, 21 around which passes the cable 10. This cable 10 is in Fig. 1 fastened at one end to the carrier beam 4 at 11; and at its other end secured to the winch 9, forming part of the revoluble support for the spare wheel 8. The winch 9 can be operated by turning by hand the spare wheel 8 on carrier beam 4.

If now the carrier beam 4¹ be unlatched and the spare wheel 8 on the opposite carrier frame 4 be turned clockwise to unwind the cable from the winch 9, the carrier beam 4¹ can be pushed beyond the vertical and then allowed to descend slowly at its outer end by gravity, being restrained by the cable 10 and falling proportionately as the cable is paid out. The beam 4¹ moves through an arc of a circle and the descent continues until the spare wheel 8 rests on the ground, as shown in dotted lines on the left-hand side of Fig. 1. Thus the spare wheel has been mechanically transferred from its stored position to its grounded position. Subsequently, when the wheel with damaged tire has taken the place of that spare wheel and it is desired to raise the carrier beam 4¹ with the damaged wheel thereon, the spare wheel 8 on carrier beam 4 is revolved in the opposite direction i. e. contra-clockwise, thereby actuating the winch 9, until the beam 4¹ is drawn up against the operation of gravity to the position in which it can be again latched in its indrawn position.

Assuming the carrier beam 4¹ latched in position and that it is wished to use the spare wheel 8 on carrier beam 4, the latching device of the latter is released, the beam 4 is started on its outward movement and then by manually turning the spare wheel 8 on the beam 4 clockwise, the winch 9 will be revolved to cause the outer end of the beam 4 to describe an arc of a circle and to descend until its spare wheel 8 reaches the ground. After changing that wheel for the damaged one and securing the latter to the support, the winch 9 can be rotated contra-clockwise by rotation of the damaged wheel upon the support (thereby operating winch 9), the carrier beam 4 being eventually brought back to the position shown in Fig. 1, in which it is again latched in position.

It will be noted, and this is an important feature of our invention, that the winch 9 (Fig. 1) or the drum-forming flange 22 of the revoluble support 7¹ (Fig. 2) can be revolved to wind up or unwind the cable 10 merely by rotating the road wheel 8 which is at the time bolted or otherwise positively mounted upon the revoluble support on that carrier beam 4.

Thus the beam 4 pivoted at its lower end to the vehicle frame and displaceable at its upper end, can be mechanically swung to bring the mounted spare tire (either spare wheel or rim-fitted tire) from an inward position upon the vehicle to an outward position; in the inward position the mounted spare tire is stored away and need not project beyond the side of the vehicle body, whilst in the outward position the mounted spare tire is grounded (see dotted lines Fig. 1) ready to be rolled to take the place of the damaged wheel.

The carrier beams 4 4¹ are of any desired shape, preferably triangular, and are represented as of dog-leg shape. We have shown the middle portion 23 of the carrier beam 4¹ as having a support 7 fixed in position on its beam whilst the drum-forming support of the carrier beam 4 is revoluble and is provided with the cable winch 9 (Fig. 1) or drum flange 22 (Fig. 2). The supports for the spare wheels 8 are accordingly arranged at the angles of these dog-leg beams that is to say intermediately of the height of the pivoted beams 4 4¹.

The spare wheels 8 are mounted flat against the beams 4 and 4¹, as will be understood from Fig. 2. The gable sides 14 are continued by upright extensions 14¹ which are bolted together and provided with suitable means such as bolts 14a for attachment to the body 5 of the vehicle. In the drawings, the framework 13 is shown secured to the vehicle frame 1 by means of U-bolts 1¹ but obviously any other suitable form of attachment may be employed.

For the latching means before mentioned, we have shown locking catches $19^1$ which are pivoted upon the top of the extensions $14^1$ and are automatically engaged by the projecting end of the spindle 24 of the sheave 20 or 21 as the carrier beam 4 or $4^1$ assumes the fully indrawn position. Either locking catch $19^1$ can be lifted about its pivot $19^2$ so as to clear the projection 24, thereby releasing the upper end of the beam 4 or $4^1$, as will be understood from Fig. 5.

In the constructions above described, the unit is set transversely of the vehicle frame so that the spare wheel 8 is set down on the ground at right angles or substantially right angles to the center line of the vehicle. In some cases, however, we may wish to provide outward movement of the beam 4 or $4^1$ at other than right angles to the vehicle frame.

Thus we have shown in Figs. 2, 3 and 4, the pivotal bearing for the carrier beam 4 in the form of a horizontal pin 3 mounted in brackets 26. This bearing is adapted to be slewed round horizontally about a vertical hinge pin 27 the outer end of pin 3 travelling in a slot $3a$ (see Figs. 1 and 9) in the curved supporting horn $3b$. This may be effected by hand as will be obvious, and the parts are locked in position. The vertical pin 27 is provided in one of said brackets 26, the other bracket having sockets 30 for a suitable locking pin $3^x$. By this means, the spare wheel 8 can be grounded or set down upon the road at other than right angles to the center line of the vehicle frame, because in some cases it is advantageous to be able to deposit the spare wheel directed towards the front or rear of the vehicle.

In Fig. 2, the spare wheel 8 is of the disc type and is secured to the hub $7^1$ by bolts 32, but we wish it to be understood that any suitable support may be provided upon the beam to engage and carry the spare wheel (or spare rim-fitted tire). The carrier beam 4 or $4^1$ will be provided with a suitable hub or support for a disc wheel, artillery wheel or wire-spoked wheel, as the case may be. Naturally the support will usually be one similar to the support on the road wheel. A mounted spare tire in the form of a removable rim $8^1$ fitted with a tire is indicated in Fig. 11, the rim being engaged by the lugs 34 on the frame $34a$ of inverted Y-shape, which frame is of well known construction.

Another form of support for a disc wheel is shown in Figs. 6 and 9, in which the support $7^{11}$ has curved flanges 33 provided with lugs 34 having bolts 32. As will be understood, the central aperture in the disc wheel is engaged by the flanges 33 and the wheel then bolted to the lugs 34.

Instead of the tires of the spare wheels bearing against the gable sides 14, we may provide saddle shaped supports 35, as shown in Figs. 6 and 7.

The revoluble support may be provided with internal reduction gear, if desired, and a suitable form of such gear is shown in Fig. 8. The support $7^{111}$ for the spare wheel 8 is here shown connected with a cable-engaging pulley $7^*$ through gear-fitted shafts of the well-known kind employed in back gear for a lathe. The revoluble support $7^{111}$ is shown provided with one of the attachment bolts 32 and formed with a sleeve $7a$ revoluble in a housing 36. The sleeve $7a$ is secured to shaft $7b$ carrying toothed pinion 37 meshing with toothed wheel 38 which latter is revoluble with countershaft 39 and pinion 40. This pinion 40 meshes with toothed wheel 41 keyed on shaft 42 secured to sleeve $7c$ revoluble in the same housing 36 and fitted with the cable engaging pulley $7^*$. By the provision of the smaller pinions 37 and 40, the pulley $7^*$ rotates at a slower speed than the support $7^{111}$.

Further, each support may be of sufficient width or depth from back to front to carry more than one spare wheel. Such an arrangement is represented in Fig. 12, where two spare wheels 8 are shown carried on a support $7^4$.

It is to be noted that one or both the supports on the two carrier beams 4 and $4^1$ may be provided with a cable drum, winch or other cable-winding means. Only one revoluble winch 9 or drum-forming flange 22 is necessary, but we may wish to provide each support with a revoluble drum or winch. The anchorage for the cable 10 at the end remote from such drum or winch, may be upon the frame 4 or $4^1$ which carries the said drum (see Fig. 1), in which case the cable passes over a pulley upon the other frame $4^1$ or 4, or, as will be seen in Fig. 13, the cable 10 may pass over a central pulley 43 mounted upon the cab $1a$ or body 5 of the vehicle, and be connected to a revoluble drum 22 or winch 9 upon the opposite beam. In all cases the end of the flexible connection 10 remote from the operating drum or winch 9 is anchored to a point upon or carried by the vehicle, so that the device is self-contained and it is not necessary to employ either an anchorage or an operating means, outside the vehicle.

Whilst we have described and shown the invention for two spare wheels (or rim-fitted tires), one for each side of the vehicle, it is obvious that, if desired, a single pivoted beam 4 might be employed having a revoluble support (with cable-winding means) for the spare wheel 8, the cable being attached at its end remote from the cable-winding means to a suitable anchorage point on the body of the vehicle, preferably above the level of the handle 12 in the indrawn position. This arrangement will be understood by reference to Fig. 13 where the pulley 43 is shown mounted on the back of the cab 1a. If the end of the cable 10 remote from the end secured to the winch 9 of Fig. 1 be hitched or fastened to said pulley 43, an anchorage point will be obtained which will enable the wheel 8 to be lowered and raised again, by unwinding or winding the cable 10 from or on winch 9.

We wish it to be understood that our improved carrier can be used not only for spare wheels but for spare rim-fitted tires, both of which we include in the term mounted spare tire.

An important feature of our invention is that the carrier member 4, or one of the carrier members 4 4¹, can be operated and moved from the tire-stored position to the tire-grounded position, or vice versa, by the rotation of the spare wheel itself, or of one of the spare wheels, directly acting on the revoluble support such as 7 on the carrier member.

From the foregoing description, it will be understood that the beam is caused to descend at its outer end by the action of gravity, and that the winch and cable 10 retard the operation of gravity. As already stated, the beam when unlatched from the position of Figure 1, is pushed manually by the handle beyond the vertical, so that gravity thereafter tends to cause the beam to swing outwardly. When the beam is being returned to its indrawn position, the winch and cable overcome the action of gravity.

What we claim is:—

1. A device for carrying upon a road vehicle a mounted spare tire, comprising a carrier beam which at one end is pivotally mounted upon the vehicle so that the other end can assume either an inward position or an outward position, a revoluble support for said mounted tire arranged upon said carrier beam, a cable secured to the carrier beam, means for fixedly securing the mounted tire on the revoluble support, and means whereby revolution of the mounted tire and its revoluble support controls through said cable, the inward and outward positions of the carrier beam.

2. A device for carrying a spare wheel upon a self-propelled road vehicle, comprising a carrier beam, a hub support for said spare wheel upon said carrier beam, said hub support being revoluble, said carrier beam at its normally lower end being pivotally secured upon the vehicle in such a manner that the upper end of said beam is displaceable laterally of the vehicle to bring said spare wheel from an inward to an outward position, said pivot for the carrier beam being horizontal and allowing the upper end of said beam to move transversely of the vehicle frame, and a flexible connection, said support including a device for operatively engaging said flexible connection, and said flexible connection being anchored at one end upon the vehicle and at its other end secured to said engaging device.

3. A displaceable device for carrying a mounted spare tire upon a self-propelled vehicle, and bringing said tire from a storage position to a grounded position, comprising a carrier beam, a support for said spare tire provided upon said carrier beam, said support being revoluble, said carrier beam being pivotally secured at one end upon the vehicle and at its other end displaceable laterally of the vehicle so as to bring the spare tire from an inward to an outward position, said pivot for the carrier beam including a horizontal pin mounted in a bracket, and a mechanism provided upon the carrier beam for controlling the swinging of said carrier beam from the inward to the outward position of the spare tire by the manual rotation of said spare tire.

4. A device for carrying a mounted spare tire upon a self-propelled vehicle, and for lowering said tire from a storage position to a grounded position, comprising a carrier beam pivotally secured at one end upon the vehicle, a revoluble support upon said beam for positively engaging said mounted tire so that said mounted tire revolves with said revoluble support, a latching device for the pivoted carrier beam, and control means provided upon the carrier beam for controlling the swinging of said beam laterally of the vehicle, said control means being operated by the manual rotation of the spare tire.

5. A device for carrying a mounted spare tire upon a wheeled road vehicle having a front driver's seat and a rear body spaced therefrom, comprising a carrier member secured to said vehicle and laterally displaceable outwards of the vehicle, said carrier member being located in the gap between the said driver's seat and body of the vehicle, a revoluble support upon said carrier member for the said mounted spare tire, and means for regulating the displacement of said carrier member from the said gap and outwards of the vehicle, said means being controlled by said revoluble support.

6. A device for carrying a mounted spare tire upon a wheeled road vehicle, comprising a carrier member of dog leg shape, a revoluble support upon said carrier member for the spare tire, said support being located at the middle portion of said carrier member, said carrier member being secured upon the vehicle and displaceable thereon so that the spare tire is brought from an inward to an outward position, means for latching the carrier member in position, and means for controlling the swinging of said displaceable carrier member, to bring said spare tire from the inward to the outward position and vice versa, said swinging control means being operated by the rotation of the spare tire with its revoluble support.

7. A mounted spare tire carrier for a road vehicle, comprising a carrier beam which at one end is pivotally mounted, by a horizontal pivot pin, in a bracket upon the vehicle so that the other end can assume either an inward position or an outward position, a support for said mounted tire, said support being located upon said carrier beam, a vertical pivotal mounting to said bracket, whereby said bracket can be slewed horizontally, said last mentioned mounting comprising a slot in a supporting guide for said horizontal pivot pin, said horizontal pivot pin travelling in said slot, means for locking the said bracket in position, and means for mechanically controlling the movement of said beam from its inward to its outward position.

8. In combination with a wheeled road vehicle, a carrier beam pivotally mounted at one end upon said vehicle and to one side of said vehicle, a second carrier beam pivotally mounted at one end upon said vehicle to the other side of said vehicle, said carrier beams at their upper ends being displaceable laterally and outwardly of the vehicle, a support for a mounted spare tire upon each of said carrier beams, said support being located intermediate of the length of said beam and means provided upon one of said carrier beams for controlling the swinging of either of said beams laterally outwards on its side of the vehicle.

9. In combination with a wheeled road vehicle, a carrier beam pivotally mounted at one end upon said vehicle and to one side of said vehicle, a second carrier beam pivotally mounted at one end upon said vehicle to the other side of said vehicle and associated with said first mentioned carrier beam, both said carrier beams at their upper ends being displaceable laterally and outwardly of the vehicle, means for controlling the displacement of either of said beams laterally and outwardly at its upper end, a support for a mounted spare tire upon each of said carrier beams, and means for latching said carrier beams in fixed position upon the vehicle, said controlling means being provided upon one of said carrier beams.

10. In combination with a self-propelled road vehicle, a pair of carrier beams pivotally secured, at their normally lower ends, to the frame of said vehicle, and one at each side of the vehicle, a support upon each of said carrier beams for engaging a mounted spare tire from inside the periphery of said tire, the upper ends of said beams being displaceable laterally and outwardly of the vehicle to bring the spare tires carried thereby from an inward to an outward position, means for controlling the lateral displacement of either of said beams at its upper end, means for automatically locking the upper ends of said carrier beams in the inward positions of the spare tires, and hand-operated control means carried by one of said beams for controlling the lateral displacement of either of said beams about its pivot.

11. A carrier for mounted spare tires for a self-propelled road vehicle, comprising a pair of beams pivotally secured at their normally lower ends, one at each side of the vehicle, and at their other ends displaceable laterally and outwardly of the vehicle from an indrawn position upon the vehicle, a support upon each of the said pivoted beams for engaging a mounted spare tire, one of said supports being revoluble upon its beam, a projection from each of said carrier beams, means for automatically latching each of said beams in its indrawn position, said latching means including pivoted levers engageable with said projections from the carrier beams, and means carried by said pivoted beams for controlling the swinging of either of said beams laterally of the vehicle, said swinging control means being operated by the manual rotation of the said revoluble support.

12. A carrier for mounted spare tires for a self-propelled road vehicle, comprising a pair of beams pivotally secured at their normally lower ends, one at each side of the vehicle, and at their other ends displaceable laterally and outwardly of the vehicle from an indrawn position upon the vehicle, a support upon each of said pivoted beams for engaging a mounted spare tire, one of said supports being revoluble upon its beam, means for automatically latching each of said beams in its indrawn position, a frame arranged transversely of the vehicle between th pivots of said pivoted beams, said frame including a gable-shaped intermediate member, supports upon said gable-shaped member for the periphery of said spare tires, and means carried by said pivoted beams for mechanically controlling the displacement laterally and outwardly of the vehicle of either of said beams at the upper end.

13. A carrier for mounted spare tires for a self-propelled road vehicle, comprising a pair of carrier beams each pivotally mounted at its lower end upon the vehicle so that its upper end can be displaced laterally of the vehicle to assume either an inward or an outward position, a support upon each said beam for a mounted spare tire, cable pulleys arranged upon the upper ends of said carrier beams, and means carried by one of said carrier beams for controlling the swinging of either of said beams laterally and outwardly of the vehicle, said means including a winch upon one of the spare-tire supports and a cable anchored at one end to said winch and anchored at its other end to the winch-carrying beam after passing over said pulleys.

14. In combination with an automobile, a mounted spare tire carrier comprising a beam pivoted at its lower end upon the automobile frame, said beam adapted to move at its outer end outwardly and laterally of the vehicle under the influence of gravity, a revoluble tire support on said beam, means for positively engaging said spare tire with said support, and means for regulating the lateral movement of the beam by retarding the operation of gravity, said means being associated with said revoluble support.

In testimony whereof we have affixed our signatures.

DONALD STUART KENNEDY.
IRWIN TREVANION KEMPE.